March 1, 1966    J. P. HOPPE    3,237,937
APPARATUS FOR PRODUCING MOVING LIGHT EFFECTS
Filed Feb. 16, 1962    2 Sheets-Sheet 1
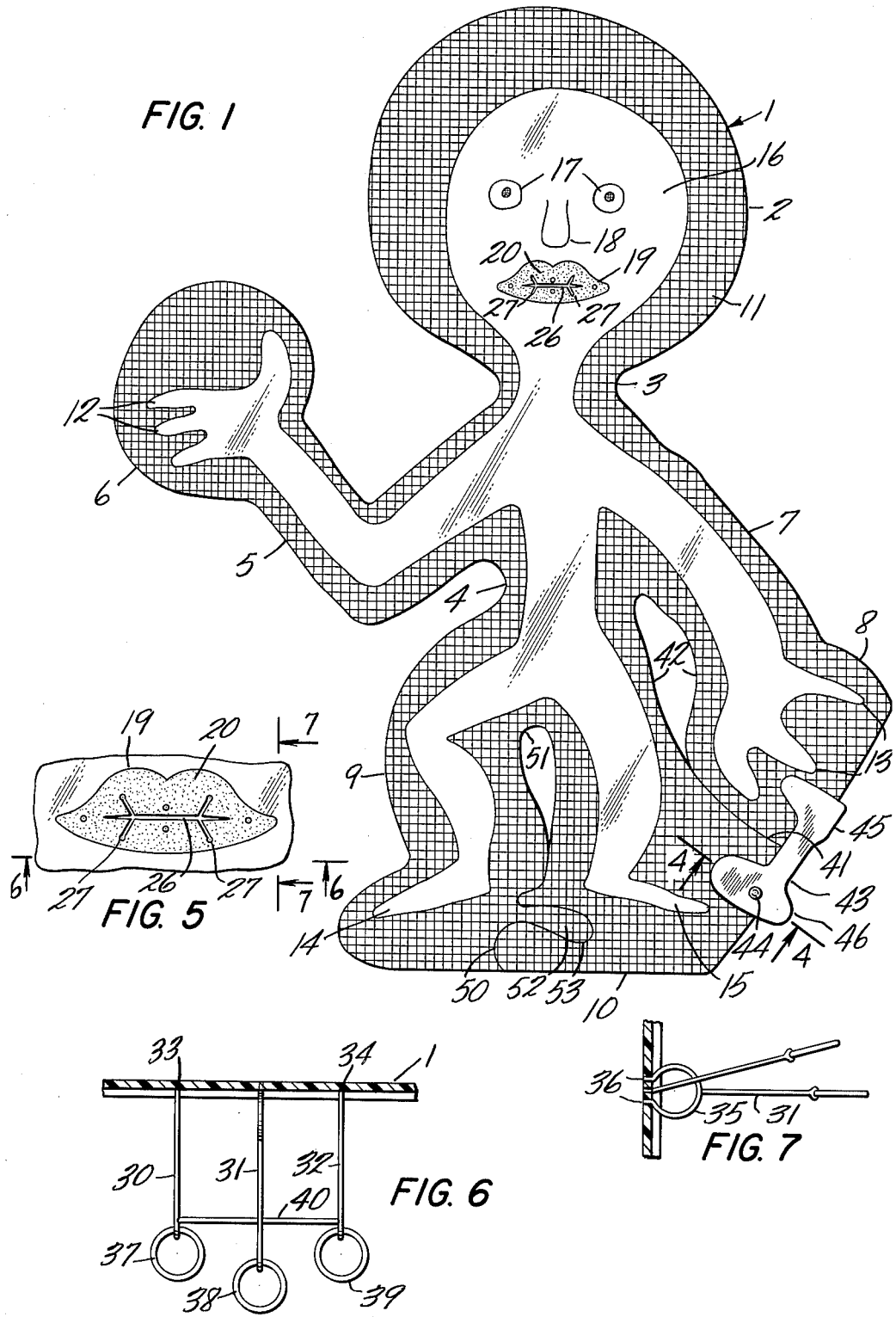

March 1, 1966  J. P. HOPPE  3,237,937
APPARATUS FOR PRODUCING MOVING LIGHT EFFECTS
Filed Feb. 16, 1962  2 Sheets-Sheet 2
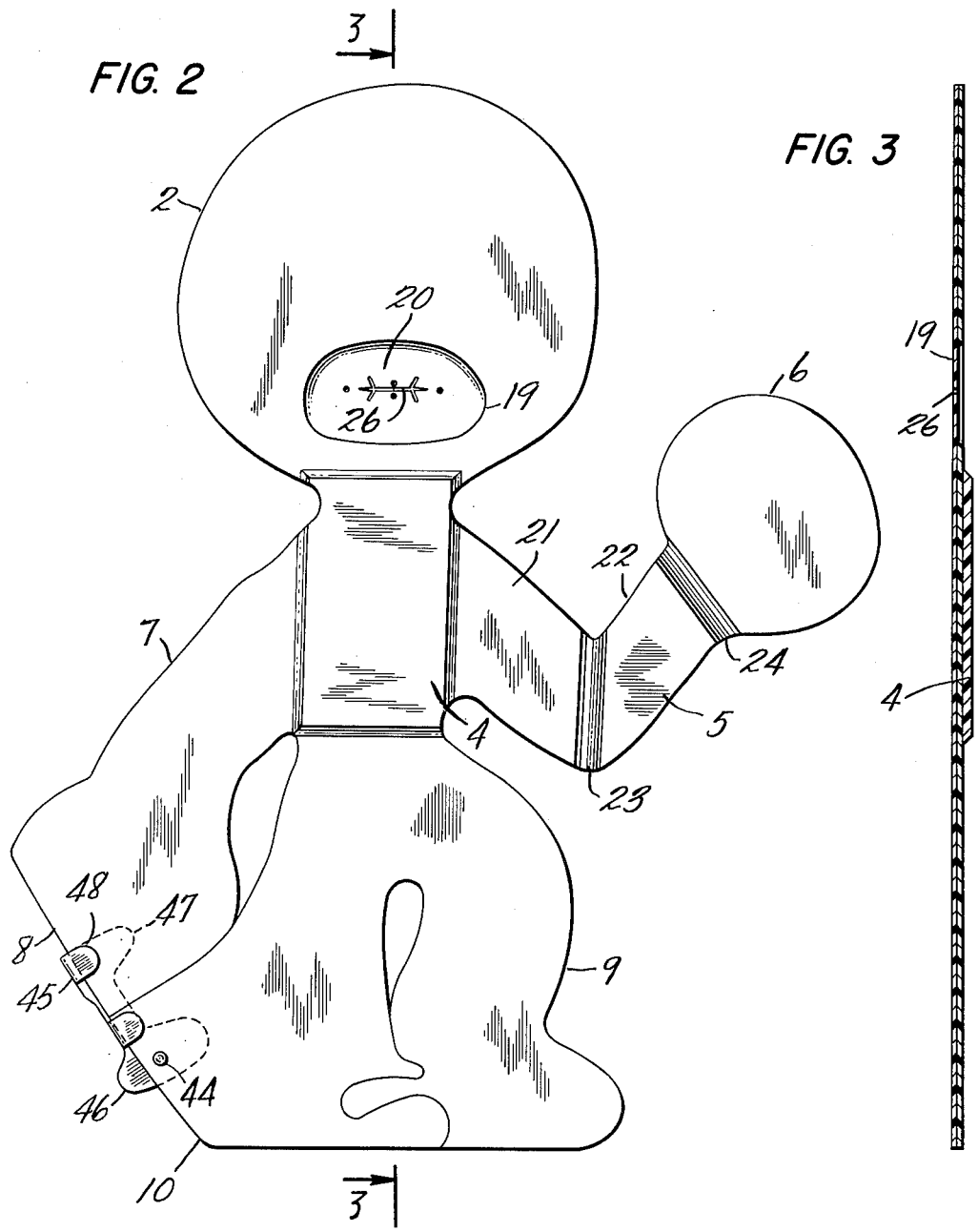
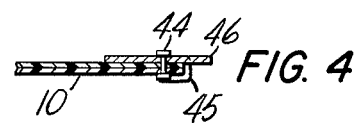

United States Patent Office 3,237,937
Patented Mar. 1, 1966

3,237,937
APPARATUS FOR PRODUCING MOVING
LIGHT EFFECTS
John P. Hoppe, New York, N.Y., assignor of one-fourth
to Robert E. Burns, Long Island, N.Y.
Filed Feb. 16, 1962, Ser. No. 173,634
10 Claims. (Cl. 272—10)

This invention relates to the production of moving light effects on a screen or the like, and has for its object the creation of improved visual displays adapted to provide entertainment and artistic interest both for individual and groups or audiences. In particular, the invention is directed to providing improved apparatus for producing artistic light effects by the control of reflected light directed onto a screen. This application is a continuation-in-part of now abandoned co-pending application, Serial No. 711,300 filed January 27, 1958 as a continuation of my application Serial No. 410,569 filed February 16, 1954 and now issued as Patent No. 2,821,393.

In accordance with the fore-mentioned patent, moving light effects are produced by reflecting light from a concentrated light source onto a screen by means of a flexible reflecting surface of selected shape while manually moving and flexing the reflecting surface to produce changes of position and form of the images on the screen. A wide variety of images and movements of an artistic nature can thus be produced.

The present invention provides further improvement and development of flexible reflectors for use in producing moving light effects by directing reflected light onto a screen. In particular, means is provided for modifying and controlling individually and jointly, the movement and flexing of individual portions of a reflector in order to produce a greater range of interesting light effects. The apparatus in accordance with the invention is suitable for use either by artists performing for a group or audience entertainment and also as toys or games for home entertainment of both children and adults. While the apparatus in accordance with the invention can be manipulated by, and afford entertainment to, persons with limited skill, it can, on the other hand, provide unlimited opportunity for the development and perfection of artistry of a professional caliber.

The objects and advantages of the invention will be more fully understood from the following description and claims in conjunction with the accompanying drawings in which:

FIG. 1 is a front view of a unit for producing animated light effects in accordance with the invention.

FIG. 2 is a rear view of the same.

FIG. 3 is a section taken approximately on the line 3—3 in FIG. 2.

FIG. 4 is a fragmentary section taken approximately on the line 4—4 in FIG. 1.

FIG. 5 is an enlarged view of a portion of the unit shown in FIG. 1.

FIG. 6 is a section taken approximately on the line 6—6 in FIG. 5 and

FIG. 7 is a section taken approximately on the line 7—7 in FIG. 5.

As disclosed in my Patent No. 2,821,393, artistic light effects are produced by reflecting light from one or more concentrated light sources onto a screen or other surfaces by means of a flexible reflector unit of selected characteristics. In accordance with the present invention, means is provided for flexing either individually or jointly selected portions of such unit and for controlling the flexibility so as to produce the effects desired. By way of example there is shown in the drawings, a reflecting unit 1 for producing the image of a little man. The reflecting unit is of suitable flexible material such as metal or plastic which is sufficiently flexible to be bent readily by digital pressure. At least one surface of the material forming the reflector is polished or plated to provide a highly reflective surface. For example, sheet plastic material having a smooth even face, is vacuum-coated with aluminum, silver or other material, to provide a mirror surface. The reflective material is cut or otherwise formed to the desired size and shape either before or after coating or polishing. Selective portions of the sheet are preferably coated or masked, for example by masking paper or paint providing a light absorbing non-reflecting surface. The masked areas are selected to define a reflecting area of the size and shape desired.

In the embodiment shown by way of example in the drawings, the reflector 1 is cut or otherwise shaped to provide a head portion 2, a neck portion 3, body portion 4, an arm portion 5 with a hand 6, a second arm portion 7 with a hand 8 and two leg portions 9 and 10. The reflective area of the unit is defined by non-reflective masking material 11 such as dull black paint applied to marginal portions of the reflector to outline the head, neck, body, arms and legs, and further define fingers 12 and 13 and feet 14 and 15. The features of a face 16 are produced by painting, drawing or otherwise producing on the reflective surface, eyes 17, a nose 18 and a mouth 19. These features can be painted, drawn, printed or otherwise produced by means of suitable paint or ink. Translucent dyes or pigment may be applied to the reflecting surface to provide the reflected image with suitable color areas as desired. For example, the eyes may be colored blue, brown, or green, while lip portions 20 of the mouth 19 may be colored red. Other portions of the reflector may be colored, if desired—for example, to represent articles of clothing worn by the figure.

When the reflecting unit 1 shown in FIG. 1 is held so as to reflect light from one or more concentrated light sources onto a screen, there will be produced on the screen a reflected image, the shape and size of which will depend on the light reflected by the reflecting unit. If the reflector is held flat, so that its reflecting surface lies in a plane approximately parallel to the screen, the image produced on the screen will have substantially the same shape as that outlined by the masking material 11 on the reflector. The image on the screen will be larger than the reflector, depending on the distance from the light source to the reflector and from the reflector to the screen. If the reflector is now moved angularly about a vertical axis approximately parallel to the screen, the image on the screen will be moved toward one side or the other of the screen, while retaining approximately its same shape. Similarly, the image can be moved vertically of the screen by tilting the reflective unit slightly about a horizontal axis approximately parallel to the screen. In addition to simple translatory movements of this kind, the figure reflected on the screen can be made to perform a wide variety of bodily movements by suitably flexing either individually or concurrently selected portions of the reflector. For example, the image can be made to appear to walk, run, or dance. Similarly, by a slight flexing of the lip portions 20, the image can be made to appear to smile, talk or yawn. A wide variety of movements and expressions is thus made possible.

In accordance with the invention, the flexibility of the reflector is controlled so as to make certain portions more flexible than others and thereby make it possible to regulater with greater facility and exactitude the various movements and characteristics of the images produced by the reflecting unit. As illustrated by way of example in FIGS. 2 and 3, certain reflector areas are made more flexible and others are made less flexible by differential thickness of the reflector. The body portion 4 is shown as being of maximum thickness and hence least flexible, the head portion 2 and leg portions 9 and 10 are of intermediate thickness and more flexible while the mouth and the lip portions 19 and 20 are of least thickness and hence greater flexibility. Moreover, an upper arm portion 21 of the arm 5 is shown by way of example as being of intermediate thickness and flexibility, while a lower arm portion 22 is of greater thickness and correspondingly less flexible. An intermediate elbow portion 23 is thinner and hence less flexible than the forearm and the upper arm portion. The hand portion 6 is of intermediate thickness and flexibility and is joined to the forearm by a wrist portion 24 which is relatively thin and correspondingly more flexible. The other arm 7 and the legs 9 and 10, may similarly be provided with thicker and thinner portions for example, to provide elbow, wrist, knee, and ankle portions of greater flexibility.

Selected areas of greater and lesser flexibility are suitably provided by forming different portions of the unit of material having different flexing characteristics, by reinforcing or laminating the material of which the reflector is formed or by otherwise making selected portions of different thicknesses. In FIG. 3, superposed laminations are shown by way of example, in order to represent more clearly the different thicknesses of the material. Thus, for example, the thinnest portions may be formed of a single layer of material, intermediate portions of two laminae and thickest portions of three or more laminae, The laminae are suitably bonded to one another, for example by fusion or adhesion. Differential flexibility of the several parts of the reflector may alternatively be provided by forming the reflector of sheet material having a thickness equal to the maximum thickness desired and then cutting, or abrading away, selected portions of the material to provide areas of lesser thickness and hence, greater flexibility.

The reflectors may also be made by a suitable casting or molding operation, to provide different portions of selected different thicknesses. While the drawing illustrates a reflecting unit having three different thicknesses, it will be understood that reflectors may be made with only two thicknesses or with more than three and that the graduation between one thickness and another may be very gradual or more abrupt as desired.

In use, the reflector unit 1 is normally held in the hands of a performer, with the fingers engaging selected portions of the reflector and movements of the several portions of the figure are effected by digital pressure exerted on selected areas. By reason of the areas of different flexibility as described above, digital pressure exerted at selected points on the reflector will cause greater flexing of some areas than others. Thus, the relatively rigid body portion 4, will remain substantially the same size and will be stationary, except for translatory movement of the image. Pressure on the hand portion 6, will tend to flex the arm more in the upper arm portion 21 than in the forearm portion 22 and still more at the thinner elbow portion 23 and wrist portion 24. This selected flexing of different portions of the figure facilitates achieving a greater range of movements of the figure and more interesting and lifelike movements.

Still other movements can be obtained by interrupting the continuity of the reflector material, for example by means of slots or slits or other openings, in combination with selected flexibility. By way of example, the mouth portion 19 is shown provided with a transversely extending slit 26 and with diverging branch slits 27. As mentioned above, the mouth area 19 is of lesser thickness than surrounding areas and hence, more flexible. The combination of the greater flexibility and the discontinuity provided by slits 26 and 27, afford a wide combination of lip and mouth movements. Such movements are readily performed by exerting digital pressure on selected areas. In order further to facilitate producing mouth movements, control means is preferably provided for selective pushing or pulling selected areas as desired.

Suitable control means is illustrated by way of example in FIGS. 6 and 7 as comprising push-pull rods 30, 31 and 32. Rods 30 and 32 are attached to the reflector at points 33 and 34 respectively located in the corner portions of the mouth 19, approximately in line with, but beyond the ends of, the transverse slit 26. The central rod 31 is attached to an arcuate or forked member 35 which is shown as being of approximately horseshoe shape with end portions attached to the reflecting material at points 36, located on opposite sides of the transverse slit 26 at approximately its mid-point. The rods 31 and 32 extend rearwardly from the reflector 1 and are preferably provided at their rear ends with finger rings 37, 38 and 39. Moreover, the side rods 30 and 32 are shown as being interconnected by a cross-number 40. It will be seen that selected portions of the mouth area can be flexed as desired by pushing or pulling on the several rods 30, 31 or 32. Moreover, upper and lower lip portions can be moved relative to one another by angular movement of the central rod 31 in a vertical plane. The control members 30, 31 and 32 in combination with the differential thickness of the mouth area and the discontinuity provided by slits 26 and 27, makes possible an extremely wide range of different mouth movements and expressions.

If desired, the eye areas 17 may similarly be made thinner and provided with slits, with or without the attachment of the control members, in order to provide different eye movements. For example, an eye of the image reflected on the screen may appear to open, close or wink by suitable flexing of the eye area of the reflector.

A further feature of the reflecting unit illustrated in the drawings, is the provision of means for increasing or decreasing the flexibility of selected portions during operation. As illustrated by way of example in the drawings, variation in flexibility is achieved by providing a discontinuity in the material of the reflector and providing means for selectively bridging the discontinuity. It will thus be seen that the arm portion 7 and leg portion 10 are separated from one another by a discontinuity in the form of a slit 41 and opening 42. A bridge member or clip 43 is pivotally mounted at 44 on the leg portion 10 and has a U-shaped portion 45 adapted to slip over and engage both sides of a portion of the hand 8. The clip 43 is preferably formed of sheet metal, plastic or other suitable material and is swingable from the "closed" position, shown in FIGS. 1 and 2 to an "open" position in which the clip is disengaged from the hand portion 8. Pivotal movement of the clip is facilitated by a projecting arm portion 46 which is engageable by the performer's finger or thumb to swing the clip from one position to another. It will be seen that the clip engages only masked portions of the reflector unit so that it does not interfere with the reflected image. Moreover, the front face of the clip is made non-reflective so that it will cast no image of its own.

When the clip 43 is in opened or disengaged position, the arm 7 is relatively flexible. When, on the other hand, the clip is in closed position so as to bridge the discontinuity 41, arm portion 7 can be flexed less readily and tends to remain more stationary by reason of being tied to the leg portion 10. If desired, the arm portion 7 may be provided with more flexible portions as described with respect to the arm 5, while the leg portion 10 may be more rigid than the arm 7. As the clip 43 can be readily flicked from one position to the other, flexibility of the arm 7 can readily be increased or decreased as desired. As will be seen from FIGS. 1 and 3, one arm 47 of the U-shaped clip portion 45 is made longer than the opposite arm portion 48. This facilitates engagement of the clip. With the hand portion 8 flexed slightly rearwardly, the clip 43 is swung to a position in which the longer arm 47 only will engage the hand portion 8. The hand portion is then flexed forwardly into engagement with the longer arm 47 and the clip 43 is swung the rest of the way to closed position, thereby engaging the shorter arm portion 48 with the rear face of the hand portion 8.

A further discontinuity comprising a slit 50 and opening 51, is provided between the two leg portions 9 and 10. The slit 50 is shaped to provide a tongue portion 52 of the leg 9 extending into a re-entry portion 53 in the leg 10. A performer, by gripping the tongue portion 52 of the leg 9 and adjacent portions of leg 10 between a thumb and the finger, can in effect unite the two legs 9 and 10 so as to stay together. Alternatively, by releasing the tongue portion 52, the performer may free the two legs 9 and 10 so as to be flexed individually relative to one another. Different movements of the image produced on the screen can thereby be obtained.

From the foregoing description, it will be seen that the improved apparatus in accordance with the present invention, provides a wide range of images produced on a screen by the reflecting unit. While the reflecting unit has been shown by way of example as providing an image in the shape of a little man, it will be understood that images representing animate, inanimate, or abstract subjects can be provided as desired by correspondingly shaping the reflector and the unmasked reflective areas provided on it. It will thus be understood that the invention is in no way limited to the particular shape or details of construction of the reflecting unit shown by way of example in the drawings and herein particularly described.

What I claim is:

1. A unit for producing animated effects by reflecting light from a concentrated light source onto a screen, said unit comprising a flexible sheet, means providing on the front face of said sheet a highly reflective mirror surface of selected size and shape to project on said screen a selected image, said sheet being sufficiently flexible to be easily flexed by digital pressure, selected portions of said sheet being thinner and more flexible than other portions so that upon application of pressure to flex said sheet said more flexible portions will flex to a greater degree than said other portions, said mirror surface being of selected shape to define a figure having a body portion and an appendage portion, a selected area of said surface forming said body portion and another area forming said appendage, and said flexible sheet in the area of said body portion being thicker and less flexible than in an area of said appendage.

2. A unit according to claim 1, in which said mirror surface is interrupted by a discontinuity in said sheet and in which said sheet in an area adjacent said discontinuity is thinner and more flexible.

3. A unit for producing animated effects by reflecting light from a concentrated light source onto a screen, said unit comprising a flexible sheet, means providing on the front face of said sheet a highly reflective mirror surface of selected size and shape to project on said screen a selected image, said sheet being sufficiently flexible to be easily flexed by digital pressure to vary the image projected by said mirror surface, said sheet having a discontinuity between adjacent portions of said sheet increasing the flexibility of said sheet and permitting a first portion of said sheet on one side of said discontinuity to be flexed separately from a second portion of said sheet on an opposite side of said discontinuity and means releasably bridging said discontinuity to cause said first and second portions of said sheet to move together.

4. A unit according to claim 3, in which said bridging means comprises a clip pivotally mounted on said sheet on one side of said discontinuity and swingable into engagement with a portion of said sheet on the opposite side of said discontinuity.

5. A unit for producing animated effects by reflecting light from a concentrated light source onto a screen, said unit comprising a flexible sheet, means providing on the front face of said sheet a highly reflective mirror surface of selected size and shape to project on said screen a selected image, said sheet being sufficiently flexible to be easily flexed by digital pressure to vary the image projected by said mirror surface, said mirror surface being of selected shape to define a figure having a body portion and adjacent first and second appendage portions, said sheet having a discontinuity between said adjacent first and second appendage portions permitting said appendage portions to be flexed separately of one another, and means releasably bridging said discontinuity to interconnect said appendage portions and thereby cause them to remain together.

6. A unit for producing animated effects by reflecting light from a concentrated light source onto a screen, said unit comprising a flexible sheet, means providing on the front face of said sheet a highly reflective mirror surface of selected size and shape to project on said screen a selected image, said sheet being sufficiently flexible to be easily flexed by digital pressure to vary the image projected by said mirror surface, said sheet having a discontinuity locally increasing the flexibility of said sheet and permitting a first portion of said sheet on one side of said discontinuity to be flexed separately from a second portion of said sheet on an opposite side of said discontinuity and manipulating means attached respectively to said first and second portions of said sheet adjacent said discontinuity and extending rearwardly of said sheet for flexing said first and second portions of said sheet relative to one another, portions of said sheet adjacent said discontinuity being thinner and more flexible than other portions of said sheet more remote from said discontinuity.

7. A unit according to claim 6, in which said discontinuity comprises a slit in said sheet and in which said manipulating means comprises a bifurcated member having two arm portions attached to said first and second portions of said sheet respectively on opposite sides of said slit and a stem extending rearwardly from said bifurcated member whereby said first and second portions are flexed together by pushing or pulling said stem and are flexed in opposite directions by tilting said stem.

8. A unit according to claim 7, in which said manipulating means further comprises stems attached to said sheet adjacent opposite ends of said slit.

9. A unit according to claim 8, further comprising means interconnecting said stems attached to said sheet adjacent opposite ends of said slit.

10. A unit for producing animated effects by reflecting light from a concentrated light source onto a screen, said unit comprising a flexible sheet, means providing on the front face of said sheet a highly reflective mirror surface of selected size and shape to project on said screen a selected image, said sheet being sufficiently flexible to be easily flexed by digital pressure to vary the image projected by said mirror surface, said sheet having a discontinuity between adjacent portions of said sheet increasing the flexibility of said sheet and permitting a first portion of said sheet on one side of said discontinuity to be flexed separately from a second portion of said sheet on an opposite side of said discontinuity, said discontinuity being shaped to form a tongue on said first portion extending into a recess in said second portion, whereby a performer by gripping said tongue and adjacent portions of said second portion can in effect unite said first and second portions to move together.

References Cited by the Examiner

UNITED STATES PATENTS

| 2,264,583 | 12/1941 | Porter | 46—126 |
| 2,821,393 | 1/1958 | Hoppe | 272—10 |
| 2,821,761 | 2/1958 | Meyers | 46—31 X |

RICHARD C. PINKHAM, *Primary Examiner.*

DELBERT B. LOWE. *Examiner.*